(12) United States Patent
Engdahl

(10) Patent No.: US 9,365,210 B2
(45) Date of Patent: Jun. 14, 2016

(54) METHOD AND ARRANGEMENT IN A HYBRID VEHICLE

(75) Inventor: Henrik Engdahl, Lindome (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 14/356,504

(22) PCT Filed: Nov. 8, 2011

(86) PCT No.: PCT/EP2011/005603
§ 371 (c)(1),
(2), (4) Date: May 27, 2014

(87) PCT Pub. No.: WO2013/068021
PCT Pub. Date: May 16, 2013

(65) Prior Publication Data
US 2014/0288753 A1 Sep. 25, 2014

(51) Int. Cl.
*B60L 9/00* (2006.01)
*B60W 20/00* (2016.01)
(Continued)

(52) U.S. Cl.
CPC .............. *B60W 20/10* (2013.01); *B60L 3/0046* (2013.01); *B60L 3/12* (2013.01); *B60L 11/14* (2013.01); *B60W 10/06* (2013.01); *B60W 10/08* (2013.01); *B60W 10/30* (2013.01); *B60L 2210/40* (2013.01); *B60L 2240/441* (2013.01); *B60L 2240/547* (2013.01); *B60L 2240/549* (2013.01);
(Continued)

(58) Field of Classification Search
USPC .......................................................... 701/22
See application file for complete search history.

(56) References Cited

U.S. PATENT DOCUMENTS 6,335,574 B1  1/2002 Ochiai et al.
7,456,509 B2 * 11/2008 Gray, Jr. .................... 290/40 C
(Continued)

FOREIGN PATENT DOCUMENTS

CN      101032938 A    9/2007
EP       1489295 A2   12/2004
(Continued)

OTHER PUBLICATIONS

International Search Report ()Sep. 28, 2012) for corresponding International Application PCT/EP2011/005603.
(Continued)

*Primary Examiner* — Hussein A. Elchanti
(74) *Attorney, Agent, or Firm* — WRB-IP LLP

(57) ABSTRACT

In a method and an arrangement for powering up a DC distribution system in a hybrid vehicle power train, the power train includes an electric storage system, an internal combustion engine, an electric motor/generator, a clutch device to connect the electric motor/generator to the internal combustion engine, a power electronics unit with a voltage regulator connected to the electric motor/generator, and an electronic control unit for controlling the power train. The electric storage system and the electric motor/generator are connectable to one or more electrical loads for driving the vehicle. The powering up includes initializing internal combustion engine ignition, initializing a diagnostics test of power train components, cranking the internal combustion engine, requesting pre-charge of the electrical loads from the power electronics unit, connecting the electric storage system to the electrical loads when the pre-charge and the diagnostics test are completed, and resuming normal operation for the power electronics unit.

15 Claims, 1 Drawing Sheet

(51) Int. Cl.
*B60L 3/00* (2006.01)
*B60L 3/12* (2006.01)
*B60L 11/14* (2006.01)
*B60W 10/06* (2006.01)
*B60W 10/08* (2006.01)
*B60W 10/30* (2006.01)

(52) U.S. Cl.
CPC .............. *B60L 2270/20* (2013.01); *Y02T 10/70* (2013.01); *Y02T 10/7077* (2013.01); *Y02T 10/7241* (2013.01); *Y10S 903/93* (2013.01)

(56) References Cited

U.S. PATENT DOCUMENTS

| | | | | |
|---|---|---|---|---|
| 8,432,058 | B2 * | 4/2013 | Matsukawa et al. | ............ 307/9.1 |
| 8,718,847 | B2 * | 5/2014 | Itagaki | ............................. 701/22 |
| 8,763,578 | B2 * | 7/2014 | Poeltenstein et al. | ..... 123/179.28 |
| 9,007,068 | B2 * | 4/2015 | Pushkolli et al. | ............. 324/522 |
| 2007/0205031 | A1 | 9/2007 | Ogata | |

FOREIGN PATENT DOCUMENTS

| | | |
|---|---|---|
| EP | 2457779 A1 | 5/2012 |
| WO | 2011010493 A1 | 1/2011 |
| WO | 2011081863 A2 | 7/2011 |

OTHER PUBLICATIONS

Japanese Official Action (Jul. 8, 2015) for corresponding Japanese App. 2014-540323.

Chinese Official Action (Sep. 16, 2015) for corresponding Chinese App. CN201180074722.6.

* cited by examiner

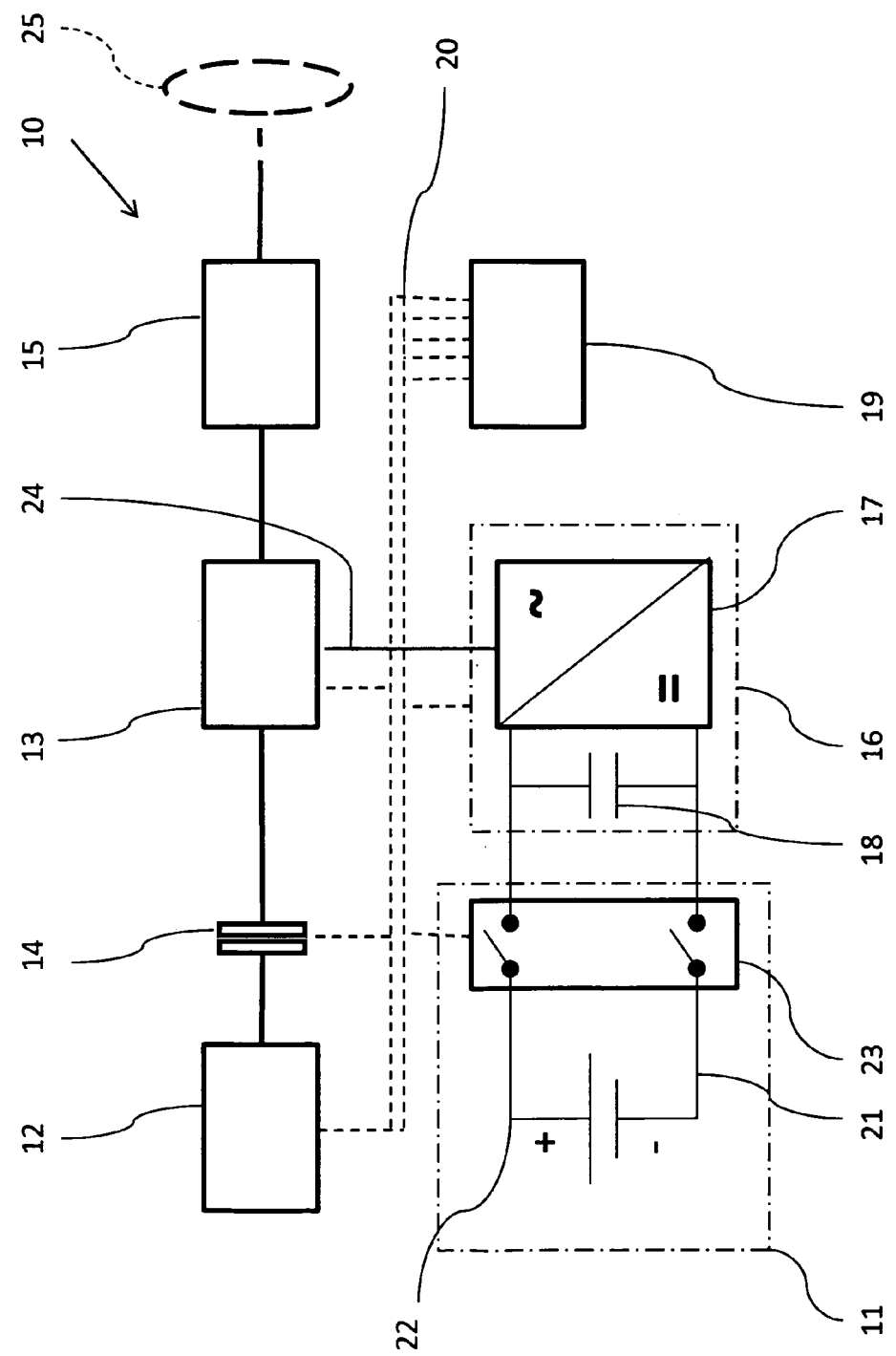

METHOD AND ARRANGEMENT IN A HYBRID VEHICLE

BACKGROUND AND SUMMARY

The present invention relates to a method and an arrangement for powering up a DC distribution system in a hybrid vehicle power train.

It is well established that in-rush currents into capacitive components are a key concern in power-up stress to components. When direct current (DC) input power is applied to a capacitive load, the step response of the voltage input will cause the input capacitor to charge. The capacitor charging starts with an in-rush current and ends with an exponential decay down to the steady state condition. When the magnitude of the in-rush peak is very large compared to the maximum rating of the components, then component stress is to be expected. The current into a capacitor is given by $I=C(dV/dT)$: the peak in-rush current will depend upon the capacitance C and the rate of change of the voltage ($dV/dT$). The in-rush current will increase as the capacitance value increases and the voltage of the power source increases. This second parameter is of primary concern in high voltage power distribution systems. By their nature, high voltage power sources will deliver high voltage into the distribution system. Capacitive loads will then be subject to high in-rush currents upon power-up. It is desirable that the stress to the components is minimized.

The objective of a pre-charge function is to limit the magnitude of the in-rush current into capacitive loads during power-up. This may take several seconds depending on the system. In general, higher voltage systems benefit from longer pre-charge times during power-up.

The functional requirement of the high voltage pre-charge circuit is to minimize the peak current out from the power source by slowing down the rate $dV/dT$ of the input power voltage. Any inductive loads on the distribution system must be switched off during the precharge mode. While pre-charging, the system voltage will rise slowly and controllably, and the power-up current will never exceed a maximum allowed value. As the circuit voltage approaches near steady state, then the pre-charge function is complete. Normal operation of a pre-charge circuit is to terminate pre-charge mode when the circuit voltage is 90% or 95% of the operating voltage. Upon completion of pre-charging, the pre-charge resistance is switched out of the power supply circuit and a low impedance power source for normal mode is connected. The high voltage loads are then powered up sequentially.

The simplest in-rush-current limiting system, used in many consumer electronics devices, is a negative temperature coefficient (NTC) thermistor or NTC resistor. When cold, its high resistance allows a small current to pre-charge the reservoir capacitor. Constructed with high temperature materials for long life and durability, an NTC thermistor's resistance drops logarithmically as its body temperature increases. The function of a Surge Limiter of this type is to first block the in-rush current and then remove itself from the circuit. It blocks the incoming current spike by offering a relatively high resistance at turn on. Alternatively, a pre-charge circuit comprising a resistor is connected in parallel with the power supply circuit. As stated above, the pre-charge circuit limits the magnitude of the in-rush current into capacitive loads during power-up and is then switched out of the power supply circuit when the normal power source is connected.

Typical resistance ranges are from 0.25 ohm to 220 ohm, depending on the amount of protection desired. As current flows through to the surge limiter, the resistance drops in milliseconds to as low as 0.01 ohm, which functionally removes it from the circuit. A reservoir capacitor is a capacitor that is used to smooth the pulsating DC from an AC rectifier. After it warms up, its low resistance more efficiently passes the working current.

For instance, consider a circuit comprising a capacitor connectable to a voltage source with a pre-charge circuit which limits the in rush current. Selecting suitable component can reduce the in-rush current to 1% of a circuit without such a pre-charge circuit, which significantly reduces stress on the components when activating a high voltage DC power distribution system. The primary benefit of avoiding component stress during power-up is to realize a long system operating life due to reliable and long lasting components.

There are additional benefits: pre-charging reduces the electrical hazards which may occur when the system integrity is compromised due to hardware damage or failure. Activating the high voltage DC system into a short circuit or a ground fault or into unsuspecting personnel and their equipment can have undesired effects. Arc flash will be minimized if a pre-charge function slows down the activation time of a high voltage power-up. A slow pre-charge will also reduce the voltage into a faulty circuit which builds up while the system diagnostics come on-line. This allows a diagnostic shut down before the fault is fully realized in worst case proportions.

In cases where unlimited in-rush current is large enough to trip the source circuit breaker, a slow precharge may even be required to avoid the nuisance trip.

Pre-charging is commonly used in electric and hybrid electric vehicle applications, An example of an application of the hybrid electric type is described in WO 2011/081863. The current to the motor is regulated by a controller that employs large capacitors in its input circuit. Such systems typically have high-current relays, or contactors, to disable the system during inactive periods and to act as an emergency disconnect should the motor current regulator fail in an active state. Without pre-charge the high voltage across the contactors and in-rush current can cause a brief arc which will cause pitting of the contacts. Pre-charging the controller input capacitors, typically to 90 to 95 percent of applied battery voltage, eliminates the pitting problem. The current to maintain the charge is so low that some systems apply the pre-charge at all times other than when charging batteries, while more complex systems apply pre-charge as pan of the starting sequence and will defer main contactor closure until the pre-charge voltage level is detected as sufficiently high.

A problem relating to pre-charging is the time required for carrying out the pre-charge procedure before the electrical power source can be connected. If this time is relatively long then the driver may experience a delay before all systems come on-line. Further problems are that the pre-chare circuit components are relatively expensive and that the circuit itself requires space in an environment that often has component packaging problems.

This invention aims to solve these problems by providing an improved method and an improved arrangement for pre-charging electrical circuits in hybrid electric vehicles.

The invention relates, according to aspects thereof, to a method and an arrangement for powering up a DC distribution system in a hybrid vehicle power train, according to the attached claims.

According to a preferred embodiment, the invention relates to a method for powering up a DC distribution system in a hybrid vehicle power train. The DC distribution system is defined as the collective electrical circuits and components that can be powered by an electric storage system in the vehicle. The power train comprises an electric storage system used for electric propulsion or for assisting an internal combustion engine driving the vehicle. The electric storage system can comprise one or more batteries or cells for supplying electrical power at a suitable voltage. According to the invention, a relatively high voltage electric storage system, for instance 100-700 V, can be used. The power train further comprises an electric motor/generator which can be driven by the combustion engine (propulsion mode) or by the vehicle wheels (regeneration mode) via the transmission to generate electrical power for driving the vehicle or for charging the electric storage system. A clutch device is provided to connect the electric motor/generator to the internal combustion engine, either directly or via a mechanical transmission such as a gearbox. The power train further comprises a power electronics unit with a voltage regulator connected to the electric motor/generator, in order to regulate the voltage of the electrical power generated by said motor. The voltage regulator is arranged to convert AC current generated by the electric motor/generator, when operated in generator mode, into DC current for charging the electric storage system and driving DC consumers in the vehicle. Also, the voltage regulator is arranged to convert DC current from the electric storage system into AC current for driving the electric motor/generator, when operated in motor mode for vehicle propulsion. The electric motor/generator is arranged to use/generate three-phase current.

An electronic control unit is provided for controlling the power train and its component parts. The electric storage system and the electric motor/generator are connectable to one or more electrical loads for driving the vehicle. The method of powering up a DC distribution system comprises the steps of;

initializing internal combustion engine ignition;
initializing a diagnostics test of power train components;
cranking the internal combustion engine;
requesting pre-charge of the electrical loads by the power electronics unit;
connecting the electric storage system to the electrical loads when the pre-charge and the diagnostics test are completed;
resuming normal operation for the power electronics unit to complete powering up of the DC distribution system.

The initializing of the internal combustion engine ignition can be performed by the driver turning a key or pressing a button or switch, by means of a smart card or similar being recognized by a control or security system or be initiated by a keyless entry system. Initializing of the diagnostics test of the power train components includes a diagnostics test for the electric storage system with its batteries or cells. Cranking of the internal combustion engine can be performed directly by a separate starter motor or via the clutch by the electric motor/generator powered by an auxiliary battery or electrical power source.

According to the method, a request for pre-charge is transmitted from the electronic control unit to the power electronics unit, which unit enters a pre-charge mode and requests a predetermined voltage from the voltage regulator. Such a request can be transmitted when it is detected that engine cranking is completed and the engine has started. The predetermined voltage requested from the voltage regulator preferably, but not necessarily, corresponds to a voltage supplied to vehicle one or more electric power takeoff units in case of electric storage system failure. The predetermined voltage is lower than the electric storage system voltage.

According to the method the voltage generated by the electric motor/generator, once the clutch has connected it to the internal combustion engine, is controlled using the voltage regulator to supply a predetermined pre-charge voltage.

Alternatively the voltage generated by the electric motor/generator is controlled using the voltage regulator to supply a voltage gradually increasing towards a predetermined pre-charge voltage.

When a diagnostics test for at least the electric storage system is completed the electric storage system is connected to the electrical loads and the vehicle is operational. Similarly, if the diagnostics test indicates an electric storage system failure, the connection of the electric storage system to the electrical loads is prevented.

The above-mentioned clutch device can connect the electric motor/generator to the internal combustion engine when a predetermined minimum engine speed is reached. This speed can be below a nominal idling speed, but is selected to be sufficient to prevent the engine from stalling when the clutch device is actuated. Actuation is automatic and does not require any action from the driver of the vehicle.

The invention further involves an arrangement for powering up a DC distribution system in a hybrid vehicle power train. As indicated above, the power train comprises an electric storage system, an internal combustion engine, an electric motor/generator, a clutch device to connect the electric, motor/generator to the internal combustion engine, a power electronics unit with a voltage regulator connected to the electric motor/generator, and an electronic control unit for controlling the power train, wherein the electric storage system and the electric motor/generator are connectable to one or more electrical loads for driving the vehicle.

The electronic control unit is arranged to initialize internal combustion engine ignition, in order to crank the internal combustion engine, to initialize a diagnostics test of power train components prior to cranking, and to request pre-charge of the electrical loads from the power electronics unit subsequent to cranking. The power electronics unit is arranged to pre-charge the electrical loads by means of electrical power generated by the electric motor/generator. The electric storage system is arranged to be connected to the electrical loads when said pre-charge and diagnostics test are completed. Finally, the power electronics unit is arranged to resume normal operation when the electric storage system is connected and powering up of the DC distribution system is completed.

A pre-charge of the electrical components is requested by the power electronics unit, which unit is arranged to enter a pre-charge mode and to request a predetermined voltage from the voltage regulator. Such a request can be transmitted when it is detected that engine cranking is competed and the engine has started.

A predetermined voltage is requested from the voltage regulator, which voltage corresponds to a voltage supplied to vehicle one or more electric power take-off units in case of electric storage system failure. The predetermined voltage is lower than the electric storage system voltage and the electric storage system is arranged to be connected to the electrical loads when a diagnostics test for at least the electric storage system is completed. If the diagnostics test for at least the electric storage system generates an error message indicating an electric storage system failure, the connection of the electric storage system to the electrical loads is prevented. An advantage of the invention is that the DC distribution system can be precharged even is the charge of the electric storage system is low or close to the minimum voltage level where electrical operation is allowed.

The arrangement described above can be used for performing the above method. The invention further relates to a vehicle comprising an arrangement as described above.

BRIEF DESCRIPTION OF DRAWINGS

In the following text, the invention will be described in detail with reference to the attached drawings. These schematic drawings are used for illustration only and do not in any way limit the scope of the invention. In the drawings:

FIG. 1 shows a schematic illustration of an arrangement for powering up a DC distribution system according to the invention.

DETAILED DESCRIPTION

FIG. 1 shows a schematic illustration of an arrangement for powering up a DC distribution system in a hybrid vehicle power train 10. The power train comprises an electric storage system 11, an internal combustion engine 12, an electric motor/generator 13, a clutch device 14 to connect the electric motor/generator 13 to the internal combustion engine 12. A transmission 15, such as a gearbox, which can be driven by the internal combustion engine 12 and or the electric motor/generator 13 is connected to at least one pair of driven wheels 25 (indicated in dashed lines). A power electronics unit 16 with a voltage regulator 17, connected to the electric motor/generator 13, and a capacitor 18. This capacitor 18 is a reservoir capacitor used for eliminating current and voltage ripples during pre-charge of the system. The voltage regulator 17 is arranged to convert a three phase AC output from the electric motor/generator 13 into a DC output for driving electrical loads (not shown) in the vehicle or charging the electric storage system 11. The voltage regulator 17 is also arranged to convert a DC output from the electric storage system 11 into a three phase AC output for driving the electric motor/generator 13 to propel the vehicle.

The DC output has a relatively low predetermined voltage of, for instance, 12, 24, 42 V or similar. The voltage regulator 17 is also arranged to transform the DC output from the electric storage system 11 from a relatively high voltage, such as 600 V, to said relatively low voltage. An electronic control unit 19 is provided for controlling the power train 10, via a control bus 20 as indicated by the dashed lines connecting the electronic control unit 19 to each component part of the power train 10. The electric storage system 11, having a positive and a negative terminal, is connected via power lines 21, 22 to one or more electrical loads, such as power take off units in the vehicle, and to the power electronics unit 16. The electric motor/generator 13 is connected to the power electronics unit 16 via a power line 24.

The electronic control unit 19 is arranged to initialize internal combustion engine ignition, in order to crank the internal combustion engine 12. FIG. 1 is schematic and does not show the equipment required for starting the IC engine 12, such as a starter motor or an auxiliary battery used for cranking. At the same time, or at least prior to cranking, a diagnostics test of power train components is initialized. The diagnostics test must at least comprise a diagnostics test for the electric storage system 11. A request for pre-charge of the electrical loads from the power electronics unit 16 is transmitted from the electronic control unit 19 to the power electronics unit 16 subsequent to cranking. A predetermined voltage is requested from the voltage regulator, which voltage is preferably, but not necessarily, corresponding to a voltage supplied to vehicle one or more electric power take-off units (not shown) in case of electric storage system failure. The predetermined voltage is lower than the electric storage system voltage. The electric power take-off units would be connected to the respective positive and negative power lines 21, 22 of the electric storage system 11 between the power electronics unit 16 and a controllable switch 23 for disconnecting the electric storage system 11 from the power electronics unit 16.

When it has been determined that cranking has been completed and that the internal combustion engine 12 is operating at least at a minimum allowable engine speed, a signal is transmitted from the electronic control unit 19 to the clutch device 14. The clutch device 14 will then close and begin to drive the electric motor/generator 13. The power electronics unit 19 is arranged to pre-charge the electrical loads by means of electrical power generated by the electric motor/generator 13, via the voltage regulator 17. At the time of powering up the DC distribution system, the electric storage system 11 is disconnected from the power electronics unit 16 and the electrical loads by means of the controllable switch 23. The controllable switch 23 comprises a pair of circuit breakers connected to the respective positive and negative terminals of the electric storage system 11. Said controllable switch 23 opens and closes in response to a signal is transmitted from the electronic control unit 19. The electric storage system 11 is arranged to be connected to the electrical loads when said pre-charge and diagnostics test are completed.

Finally, the power electronics unit is arranged to resume normal operation when the electric storage system 11 is connected by the closing of the controllable switch 23, whereby the powering up of the DC distribution system is completed.

The invention is not limited to the above embodiments, but may be varied freely within the scope of the claims.

The invention claimed is:

1. A method for powering up a DC distribution system in a hybrid vehicle power train, the power train comprising an electric storage system, an internal combustion engine, an electric motor/generator, a clutch device to connect the electric motor/generator to the internal combustion engine, a power electronics unit with a voltage regulator connected to the electric motor/generator, and an electronic control unit for controlling the power train, wherein the electric storage system and the electric motor/generator are connectable to one or more electrical loads for driving, the vehicle, comprising initializing internal combustion engine ignition;
initializing a diagnostics test of power train components;
cranking the internal combustion engine using a starter motor;
requesting pre-charge of the electrical loads from the power electronics unit, comprising requesting a predetermined voltage from the power electronics unit and controlling the voltage regulator to enter a pre-charge mode to power up the DC distribution system;
connecting the electric storage system to the electrical loads when the diagnostics test and the pre-charge are completed; and
resuming normal operation for the power electronics unit to complete powering up of the DC distribution system.

2. A method according to claim 1, comprising, requesting pre-charge from the power electronics unit, which enters a pre-charge mode and requests a predetermined voltage from the voltage regulator.

3. A method according to claim 2, comprising requesting a set predetermined voltage from the voltage regulator, which voltage corresponds to a voltage supplied to vehicle one or more electric power takeoff units in case of electric storage system failure.

4. A method according to claim 2, comprising the predetermined voltage being lower than the electric storage system voltage.

5. A method according to claim 1, comprising controlling the voltage generated by the electric motor/generator using the voltage regulator to supply a predetermined pre-charge voltage.

6. A method according to claim 1, comprising connecting the voltage generated by the electric motor/generator using the voltage regulator to supply a voltage gradually increasing towards a predetermined pre-charge voltage.

7. A method according to claim 1, comprising connecting electric storage system to the electrical loads when a diagnostics test for the electric, storage system is completed.

8. A method according to claim 1, comprising preventing connection of the electric storage system to the electrical loads if the diagnostics test indicate an electric storage system failure.

9. A method according to claim 1, comprising actuating the clutch device connecting the electric motor/generator to the internal combustion engine when a predetermined minimum engine speed is reached.

10. Arrangement for powering up a DC distribution system in a hybrid vehicle power train, the power train comprising an electric storage system, an internal combustion engine, an electric motor/generator, a clutch device to connect the electric motor/generator to the internal combustion engine, a power electronics unit with a voltage regulator connected to the electric motor/generator, and an electronic control unit for controlling the power train, wherein the electric storage system and the electric motor/generator are connectable to one or more electrical loads for driving the vehicle, wherein the electronic control unit is configured to initialize internal combustion engine ignition, in order to crank the internal combustion engine, to initialize a diagnostics test of power train components prior to cranking, and to request pre-charge of the electrical loads from the power electronics unit subsequent to cranking;

the power electronics unit is configured to pre-charge the electrical loads by means of electrical power generated by the electric motor/generator;

the electric storage system is configured to be connected to the electrical loads when the diagnostics test and the pre-charge are completed; and the power electronics unit is configured to resume normal operation when the electric storage system is connected and powering up of the DC distribution system is completed.

11. Arrangement according to claim 10, wherein pre-charge is requested by the power electronics unit, which unit is configured to enter a pre-charge mode and to request a predetermined voltage from the voltage regulator.

12. Arrangement according to claim 11, wherein the voltage is requested from the voltage regulator, which voltage corresponds to a voltage supplied to one or more electric power take-off units on the vehicle in case of electric storage system failure.

13. Arrangement according, to claim 11, wherein the predetermined voltage is lower than the electric storage system voltage.

14. Arrangement according to claim 10, wherein the electric storage system is configured to be connected to the electrical loads when a diagnostics test for the electric storage system is completed.

15. Vehicle comprising an arrangement for powering up a DC distribution system in a hybrid vehicle power train, the power train comprising an electric storage system, an internal combustion engine, an electric motor/generator, a clutch device to connect the electric motor/generator to the internal combustion engine, a power electronics unit with a voltage regulator connected to the electric motor/generator, and an electronic control unit for controlling the power train, wherein the electric storage system and the electric motor/generator are connectable to one or more electrical loads for driving the vehicle, wherein the electronic control unit is configured to initialize internal combustion engine ignition, in order to crank the internal combustion engine, to initialize a diagnostics test of power train components prior to cranking, and to request pre-charge of the electrical loads from the power electronics unit subsequent to cranking;

the power electronics unit is configured to pre-charge the electrical loads by means of electrical power generated by the electric motor/generator;

the electric storage system is configured to be connected to the electrical loads when the diagnostics test and the pre-charge are completed; and the power electronics unit is configured to resume normal operation when the electric storage system is connected and powering up of the DC distribution system is complete.

* * * * *